(12) United States Patent
Matsumoto

(10) Patent No.: US 7,081,609 B2
(45) Date of Patent: Jul. 25, 2006

(54) LIGHT-RECEIVING CIRCUIT CAPABLE OF COMPENSATING A TEMPERATURE DEPENDENCE OF AN OPTICAL SENSITIVITY OF A PHOTODIODE

(75) Inventor: Kengo Matsumoto, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 47 days.

(21) Appl. No.: 10/809,803

(22) Filed: Mar. 26, 2004

(65) Prior Publication Data

US 2004/0245436 A1 Dec. 9, 2004

(30) Foreign Application Priority Data

Mar. 27, 2003 (JP) ............................. 2003-089274

(51) Int. Cl.
*G01J 1/44* (2006.01)
*H01J 7/24* (2006.01)
*H01J 40/14* (2006.01)

(52) U.S. Cl. .................. 250/214 C; 250/238; 327/512; 327/513; 361/103

(58) Field of Classification Search ............ 250/214 R, 250/214 C, 214 L, 238; 327/512–514; 361/140, 361/103
See application file for complete search history.

(56) References Cited

U.S. PATENT DOCUMENTS

| | | | | |
|---|---|---|---|---|
| 4,153,835 A | * | 5/1979 | Lau et al. ................ | 250/214 C |
| 4,438,348 A | * | 3/1984 | Casper et al. ................ | 327/513 |
| 6,031,219 A | | 2/2000 | Shuke | |
| 6,157,022 A | | 12/2000 | Maeda et al. | |
| 6,222,660 B1 | | 4/2001 | Traa | |
| 6,313,459 B1 | | 11/2001 | Hoffe et al. | |
| 6,851,849 B1 | * | 2/2005 | Kimura ..................... | 374/163 |
| 2004/0079866 A1 | * | 4/2004 | Nishiyama ............. | 250/214 R |

FOREIGN PATENT DOCUMENTS

| | | |
|---|---|---|
| JP | 1989-215140 | 8/1989 |
| JP | 1999-205249 A | 7/1999 |

* cited by examiner

Primary Examiner—Stephone B. Allen
Assistant Examiner—Suezu Ellis
(74) Attorney, Agent, or Firm—McDermott Will & Emery LLP

(57) ABSTRACT

The present light-receiving circuit provides a function capable of adjusting the temperature dependence and the output of the bias supply circuit independently. The light-receiving circuit includes a bias supply circuit, a voltage divider and a temperature compensation circuit that adjusts a division ratio of the voltage divider so as to depend linearly on the temperature. The temperature compensation circuit has a differential amplifier operating in the inverting mode, and a temperature-sensing resistor that connects the inverting input to the output of the differential amplifier. Since the temperature-sensing resistor has a linear dependence on the temperature and is connected as a feedback resistor, the output of the differential amplifier also depend linearly on the temperature.

9 Claims, 5 Drawing Sheets

LIGHT-RECEIVING CIRCUIT CAPABLE OF COMPENSATING A TEMPERATURE DEPENDENCE OF AN OPTICAL SENSITIVITY OF A PHOTODIODE

BACKGROUND OF THE INVENTION

1. Field of the Invention

This invention relates to a light-receiving circuit that enables to compensate a temperature dependence of an optical sensitivity of a photodiode.

2. Related Prior Art

An avalanche photodiode (APD) has a superior optical sensitivity and can respond to high frequencies, therefore, the APD may be used in a light-receiving module of an optical communication system. On the other hand, the APD shows a temperature dependence in its multiplication factor and, accordingly, affects quality of the optical and the electrical signal in the optical communication system. Particularly in the high-speed optical communication over 10 Gbps, such less quality causes transmission errors of the optical signal. The light-receiving circuit using the APD, therefore, a function of temperature compensation should be taken into account.

Various techniques to compensate the temperature dependence of the APD are reported. For example, Japanese patent published by 989-215140 has disclosed that the bias voltage supplied to the APD is adjusted by a transistor having a temperature dependence capable of compensating that of the APD. Another technique is shown in FIG. 1 that the bias voltage is corrected based on the temperature dependence of the thermistor.

Japanese patent published by 1999-205249 has disclosed a technique that the bias voltage is adjusted by the collector current of the transistor, the base of which is connected to the temperature sensor having an optional temperature co-efficient. The temperature sensor varies the base current so that the collector current thereof is changed.

However, a compensation circuit using the transistor or the thermistor is hard to adequately compensate the APD because such active devices show non-linear temperature dependence while the APD has liner temperature dependence. The optical bias voltage, at which the APD shows an optimal multiplication factor to a predetermined optical magnitude, is denoted by a linear function to the temperature T.

Moreover, the APD as one kind of semiconductor devices intrinsically has a scattered characteristic. For example, the APD applied in the optical communication system having 10 Gbps speed has nearly 10% scattered temperature dependence in its optical sensitivity. For such APD, adjusting the bias voltage so as to obtain an optical sensitivity affects the temperature dependence of the APD. The optimal sensitivity defined by the bias voltage applied thereto and the temperature dependence are preferably adjusted independently.

One object of the present invention is to provide a light-receiving circuit for the APD that solves aforementioned subjects, namely, the temperature dependence and the optimal bias voltage of the APD are independently compensated.

SUMMARY OF THE INVENTION

According to one aspect of the present invention, a light-receiving circuit including a light-receiving device comprises a bias supply circuit, a voltage divider and a temperature compensation circuit. The light-receiving device is preferably an avalanche photodiode. The bias supply circuits outputs a bias voltage to the avalanche photodiode. The voltage divider, which has a division ratio, receives the bias voltage output from the bias supply circuit, divides the bias voltage based on the division ratio thereof and feeds the divided voltage back to the bias supply circuit. The temperature compensation circuit adjusts the division ration of the voltage divider such that the bias voltage compensates, preferably as a linear function to temperatures, the temperature dependence of the avalanche photodiode.

The temperature compensation circuit may include a differential amplifier operating in an inverting mode, a coupling resistor and a temperature-sensing resistor. The coupling resistor couples the output of the differential amplifier to the input of the bias supply circuit. The temperature-sensing resistor, which senses the temperature of the avalanche photodiode, connects the inverting input of the differential amplifier to the output thereof, namely, the temperature-sensing resistor is connected as a feedback element of the differential amplifier. The differential amplifier may be an operational amplifier.

In a aforementioned configuration, the temperature sensing resistor may have a positive temperature co-efficient, especially greater than 1000 ppm/° C., for compensating the temperature dependence of the avalanche photodiode.

The temperature compensation circuit may further include a first and a second input, and a resistor. The first input couples to the inverting input of the differential amplifier via the resistor, and the second input couples to the non-inverting input of the differential amplifier. The first signal, which determines the magnitude of the bias voltage, is inputted to the first input, and the second signal, which compensates the temperature dependence of the avalanche photodiode, is inputted to the second input superposed with first signal.

Another configuration of the present invention, the light-receiving circuit further includes a thermistor and a microprocessor. The thermistor monitors the temperature of the avalanche photodiode, and outputs an electrical signal corresponding to the temperature thereof. The microprocessor receives the electrical signal output from the thermistor and outputs the first and the second signal to the temperature compensation circuit.

DETAILE DESCRIPTION OF PREFERRED EMBODIMENTS

Next, a light-receiving circuit and an optical communication system according to the present invention will be described as referring to accompany drawings. In the description and drawings, the same elements will be referred by the same numerals or symbols without overlapping explanations.

First Embodiment

Figure 1:
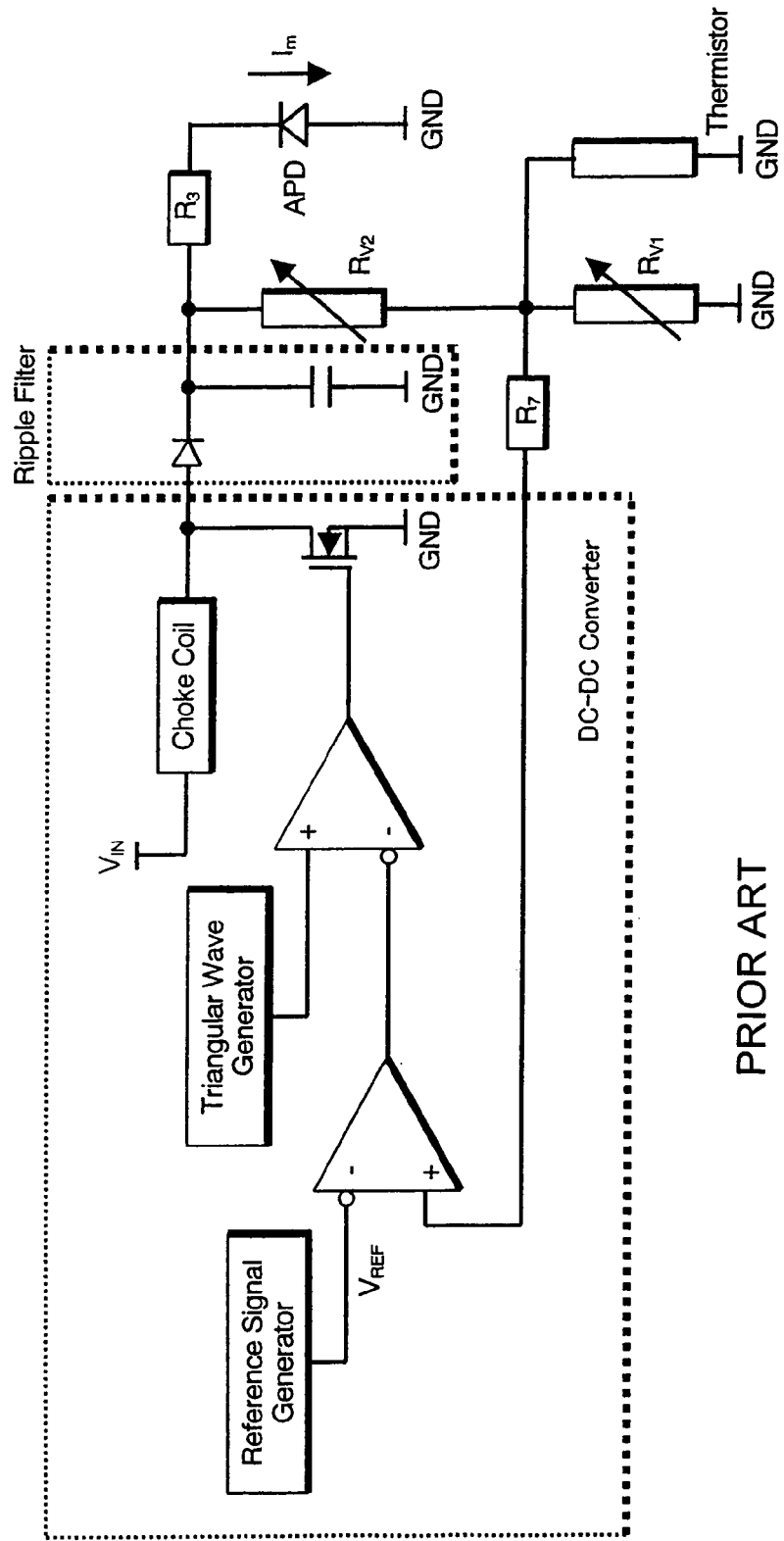
FIG. 1 is an example of prior light-receiving circuit in which a function of the temperature compensation is realized.
Figure 2:
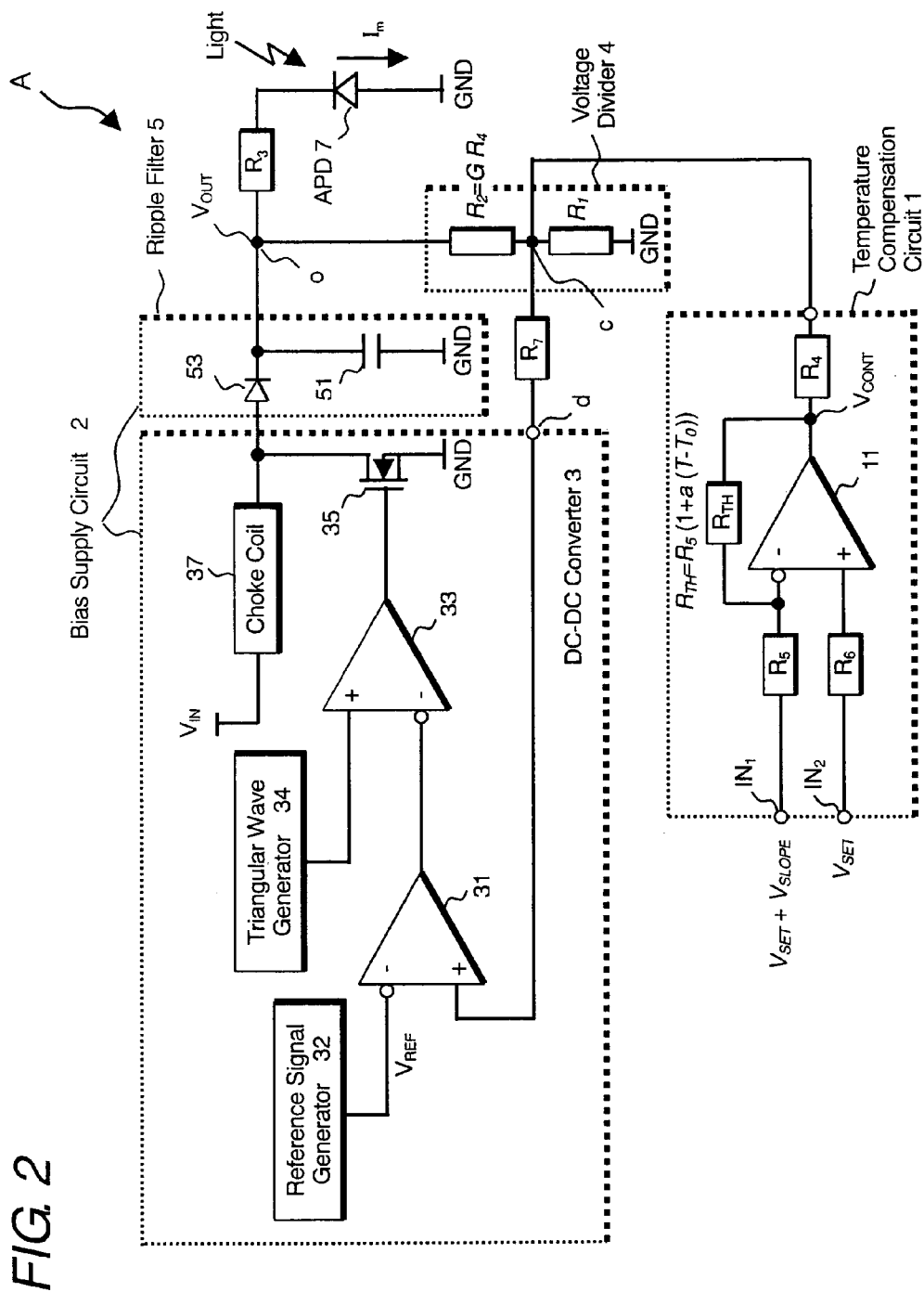
FIG. 2 is a light-receiving circuit according to the first embodiment of the present invention.

FIG. 2 is a light-receiving circuit A according to the first embodiment. The light-receiving circuit A includes a light-receiving device 7 such as an avalanche photodiode (APD), a bias supply circuit 2, a temperature compensation circuit 1 and a voltage divider 4. The APD 7 generates a photo current $I_m$ corresponding to magnitude of the light received thereby. Magnitude of the photo current to that of the received light is determined by the bias voltage supplied to the APD 7.

The temperature compensation circuit 1 will be described in its configuration and the operation. The temperature compensation circuit 1 includes a differential amplifier 11 such as an operational amplifier, a temperature-sensing resistor $R_{TH}$, a plurality of resistors $R_4$ to $R_6$, a first inpuIN1, and a second inpuIN2. The differential amplifier 11 operates as an inverting mode, in which a resistive element is connected between the inverting input and the output thereof and a signal is inputted to the inverting input. The resistive element in the present embodiment is the temperature-sensing resistor $R_{TH}$, the resistance of which has a linear dependence on the temperature that is denoted by:

$$R_{TH} = R_5(1 + a(T - T_0)) \; [\Omega] \quad (1)$$

Where, $T_0$ is a reference temperature [° C.], T is a practical temperature [° C.], $R_5$ is resistance [Ω] at the reference temperature $T_0$ and a is a temperature coefficient of the temperature-sensing resistor $R_{TH}$, respectively.

In the present embodiment, the temperature-sensing resistor $R_{th}$ having the temperature coefficient greater than 1000 [ppm/° C.] is preferably used. For example, Panasonic ERAS15J103V with a slab shape is well known as the temperature-sensing resistor $R_{TH}$. The temperature-sensing resistor $R_{th}$ is disposed immediately close to the APD 7 in the housing to detect a temperature of the APD 7.

The non-inverting input of the differential amplifier 11 is connected to the second input IN$_2$ via the resistor $R_6$, while the inverting input of the differential amplifier 11 is connected to the input IN$_1$ via the resistor $R_5$. The input IN$_2$ is provided $V_{SET}$, which defines the bias voltage when the APD 7 is under a predetermined temperature. The input IN$_1$ is provided $V_{SET} + V_{SLOPE}$, which adjusts the temperature dependence of the bias supply circuit.

Assuming the input impedance of the differential amplifier 11 is large enough, the signal $V_{SET}$ applied to the IN$_1$ is directly appeared in the non-inverting input of the differential amplifier 11. Another signal $V_{SET} + V_{SLOPE}$ applied to the input IN$_2$ is amplified in the inverting mode of differential amplifier 11 by the resistor $R_5$ and the temperature-sensing resistor $R_{TH}$. Accordingly, the output $V_{CONT}$ of the differential amplifier 11 becomes;

$$V_{CONT} = V_{SET} - V_{SLOPE}(R_{TH}/R_5) \quad (2)$$

Inserting Eq. 1 into the temperature-sensing resistor $R_{TH}$, the output $V_{CONT}$ becomes;

$$V_{CONT} = V_{SET} - V_{SLOPE}(1 + a(T - T_0)) \quad (3)$$

Thus, the output $V_{CONT}$ of the differential amplifier 11 has a linear dependence on the temperature, and the temperature dependence thereof can be adjusted by the signal $V_{SLOPE}$. Moreover, by adjusting another signal $V_{SET}$ independently of the signal $V_{SLOPE}$, the output $V_{CONT}$ of the differential amplifier 11, which corresponds to the output at the reference temperature $T_0$ [° C.], can be adjusted without affecting the temperature dependence of thereof.

Next, the operation and the function of the bias supply circuit 2 will be described. The bias supply circuit 2 includes a DC—DC converter 3 and a ripple filer 5. The DC—DC converter includes an operational amplifier 31, a reference signal generator 32, a comparator 33, a triangular wave generator 34, an n-type MOSFET 35 and a choke coil 37. A reference signal $V_{REF}$ [V] generated in the reference signal generator 32 is applied to the inverting input of the operational amplifier 31. A triangular wave generated by the triangular wave generator 34 is applied to the non-inverting input of the comparator 33, while the output of the operational amplifier 31 is guided to the inverting input of the comparator 33. Accordingly, the comparator 33 outputs a positive level when the triangular wave is greater than the output of the operational amplifier 31, namely, the period of the positive output of the comparator is prolonged when the output of the operational amplifier 31 is low, on the other hand, the period thereof is shortened when the output of the operational amplifier 31 becomes high.

The output of the comparator 33 is conducted to the gate of the MOSFET 35, which operates as a chopper device. The source of the MOSFET 35 is grounded, while the drain is connected to the voltage source $V_{IN}$ via the choke coil 37. When the output of the comparator 33 is high, the MOSFET 35 turns on and the drain current thereof flows from the voltage source $V_{IN}$ to the ground. When the gate of the MOSFET 35 is positively biased to the source, the current flowing through the choke coil 37 gradually increase and simultaneously accumulates magnetic energy in the choke coil 37. Assuming inductance of the choke coil 37 is L [H], the magnetic energy accumulated in the choke coil 37 becomes $I_L^2/2/L$, when the current flowing through the choke coil 37 is $I_L$. This accumulated magnetic energy is released to the ripple filter 5 when the MOSFET is turned off, namely, during a period when the triangular wave is lower than the output of the operational amplifier 31.

The ripple filter 5 includes a capacitor 51 and a diode 53. The anode of the diode 53 is connected to the choke coil. The ripple filter receives a low level signal ($V_{IN} \cdot L\Delta I_L/\Delta t$) [V] when the current flowing thorough the choke coil is increasing, and receives a high level signal $V_{IN}$, namely, a constant current flowing through the choke coil when the drain current is shut off. Thus, the ripple filter 5 is applied an alternating signal synchronized with the signal applied to the gate of the MOSFET.

One terminal of the capacitor 51 is grounded, while the other terminal thereof is connected to the cathode of the diode 53 which is the output O of the bias supply circuit 2. The capacitor 51 functions to increase an electrical charge accumulated in the capacitor 51 when a high voltage is applied to the anode of the diode 53, and to release the charge accumulated in the capacitor 51 via the resistor $R_3$ when a low signal is applied to the diode 53, thereby maintaining the output of the bias supply circuit 2. The capacitance of the capacitor 51 is selected such that a ripple included in the output of the bias supply circuit 2 is to be reduced.

The output of the bias supply circuit 2 is divided by the voltage divider 4, which includes resistors $R_1$ and $R_2$. The divided voltage is appeared in the node C. The node C and the node D of the bias supply circuit 2 is connected via the resistor $R_7$. Therefore, the voltage divider 4 forms a feedback circuit that operates as those described below. When the level of the node C is lowered, which simultaneously lowering the level of the inverting input of the operational amplifier 31, a period, during which the MOSFET turns on and flows the drain current, is lengthened and the output of the bias supply circuit 2 rises, which also rises the level of the node C. Thus, the feedback operation is realized.

The output of the temperature compensation circuit 1 is also connected to the node C via the coupling resistor $R_4$. Next, an operation how the output $V_{OUT}$ can be adjusted by controlling the input of the temperature compensation circuit 1 will be described.

When the temperature increase and accordingly the resistance of the temperature-sensing resistor increase, the output $V_{CONT}$ of the temperature compensation circuit 1 decreases, which decreases the level of the node C and oppositely increases the output of the bias supply circuit 2. However, due to the feedback operation described above, the level of the node C and that of the non-inverting input of the operational amplifier 31 should be recovered to the reference voltage $V_{REF}$. Assuming the change of the temperature compensation circuit 1 is $\Delta V_{CONT}$ [V], the current flown through the resistors $R_2$ and $R_4$ is increased by $\Delta V_{CONT}/R_4$ [A]. Therefore, the output $V_{OUT}$ of the bias supply circuit 2 increases by $\Delta V_{CONT}/R_4 \cdot R_2$ [V].

The output $V_{OUT}$ of the bias supply circuit 2 becomes, when the non-inverting input of the operational amplifier 31 and the level of the node C recovers to $V_{REF}$ [V], $$V_{OUT} = (1 + G + GR_4/R_1)V_{REF} - GV_{CONT} \quad (4)$$
$$= (1 + G + GR_4/R_1)V_{REF} - GV_{SET} +$$
$$GV_{SLOPE}(1 + a(T - T_0))$$
$$= ((1 + G + GR_4/R_1)V_{REF} - GV_{SET} + GV_{SLOPE}) +$$
$$GV_{SLOPE}a(T - T_0),$$

$$G = R_2/R_4.$$

Thus, the output $V_{OUT}$ of the bias supply circuit is denoted as a linear function of the temperature T. The second term of the above equation, $GV_{SLOPE}$ a $(T-T_0)$, has a linear dependence on the temperature T, and a product $GV_{SLOEP}$ a is the temperature co-efficient. Therefore, by changing $V_{SLOPE}$, the temperature dependence of the output $V_{OUT}$ of the bias supply circuit 1 can be adjusted. Further, the first term of the above equation, $((1+G+GR_4/R_1)V_{REF}-GV_{SET}+GV_{SLOPE})$ defines $V_{OUT}$. Therefore, by changing $V_{SET}$ after setting $V_{SLOPE}$, $V_{SET}$ can be adjusted without affecting preset condition of $V_{SLOPE}$.

Figure 3:
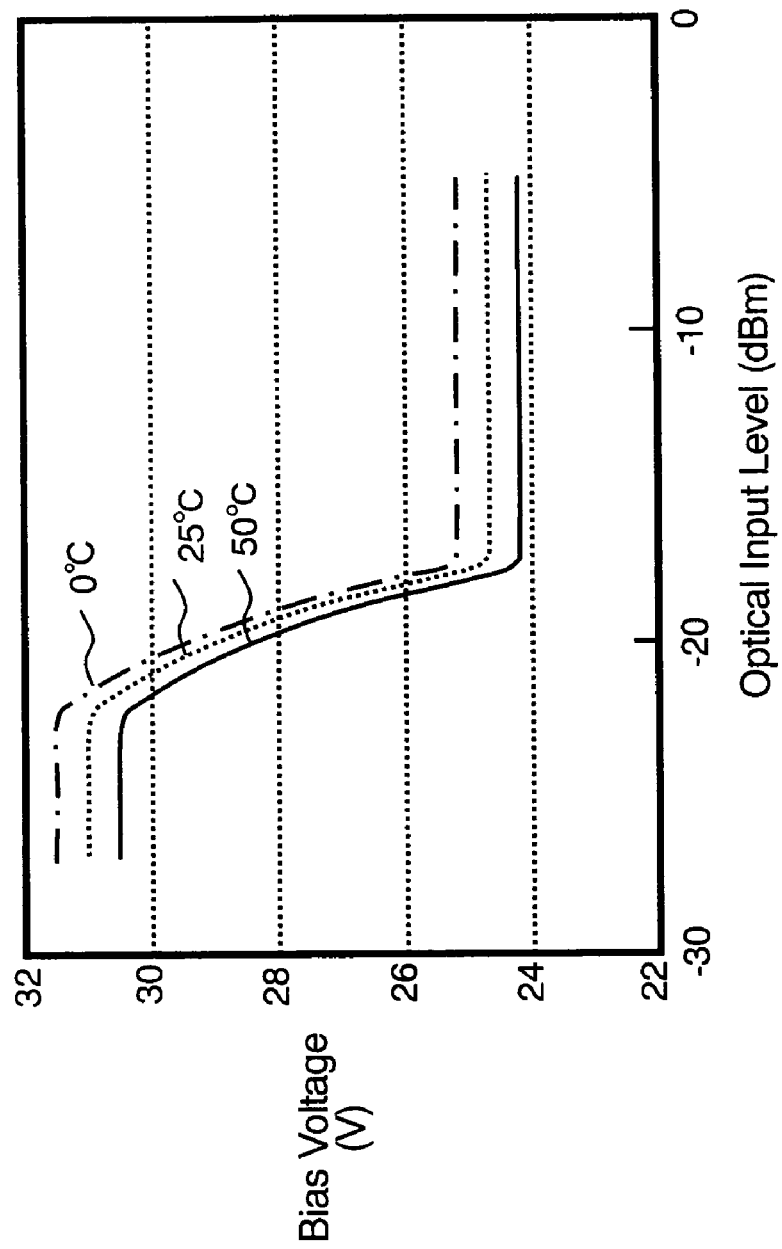
FIG. 3 shows a relation between the optical input power and the bias voltage, at which the multiplication factor of the APD becomes an optimal value, at 0° C., 25° C. and 50° C.

FIG. 3 shows a relation, under various temperatures of 0° C., 25° C. and 50° C., of the optical magnitude inputted to the APD 7 to the bias voltage at which the APD 7 shows an optimal multiplication factor. The optical multiplication factor means that the bit error rate due to the APD 7 becomes the minimum. As shown in FIG. 3, the bias voltage at which the APD 7 shows the optimal multiplication factor is different in temperatures. The bias voltage applied to the APD 7 shows a linear relation to the temperature.

Generally, the temperature dependence of APDs is scattered in device to device. However, in the present embodiment, only adjusting the input of the temperature compensation circuit 1, the respective temperature dependence of APDs can be compensate. The bias voltage VAPD applied to the APD 7 is denoted by;

$$V_{APD} = V_{OUT} \cdot R_3 I_m [V] \quad (5)$$

Therefore, the temperature dependence of the bias voltage $V_{APD}$ is equal to that of the APD 7. Further, by adjusting $V_{SET}$, the magnitude of the bias voltage $V_{APD}$ can be set to the value at which the APD 7 shows the optimal multiplication factor without affecting the temperature dependence thereof.

Second Embodiment

Figure 4:
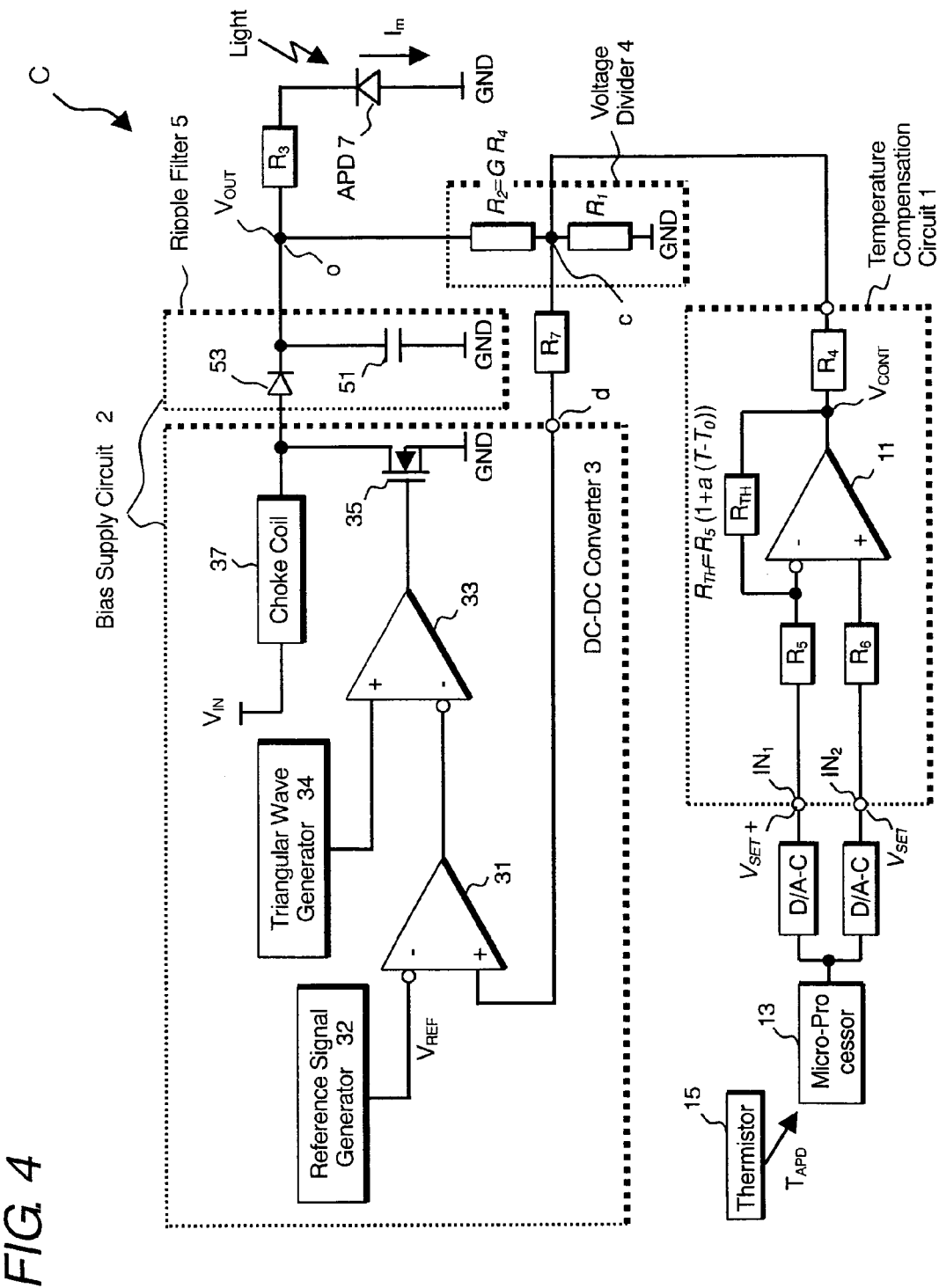
FIG. 4 is a light-receiving circuit according to the second embodiment of the present invention.

FIG. 4 is a modified light-receiving circuit C according to the second embodiment of the present invention. The light-receiving circuit C includes a microprocessor 13 that operates as a controller and a thermistor 15 for generating a signal corresponding to a temperature of the APD 7. The microprocessor 13 controls the temperature dependence and the output of the bias supply circuit 2 by setting inputs to $IN_1$ and $IN_2$ via two digital-to-analog converters $DAC_1$ and $DAC_2$. These $DAC_1$ and $DAC_2$ may be installed within the microprocessor 13. The light-receiving circuit C is distinguished from the first light-receiving circuit A by the viewpoint of the existence of the digital-to-analog converters, but the other configurations are same as those in the first light-receiving circuit A.

The thermistor 15 is positioned immediately close to the APD 7 such that the thermistor 15 monitors the temperature of the APD 7 and outputs a signal corresponding to the temperature. The microprocessor 13, based on the signal output from the thermistor 13, provides the input $V_{SET}+V_{SLOPE}$ via the digital-to-analog converter $DAC_1$. Under the control by the microprocessor, when the temperature of the APD 7 is within a predetermined range, the signal $V_{SLOPE}$ is set to be a positive constant. However, the temperature of the APD 7 is output of the predetermined range, especially at high temperatures, the microprocessor sets the signal $V_{SLOPE}$ so as to be relatively small values, thereby protecting the APD 7 from the breakdown.

Third Embodiment

Figure 5:
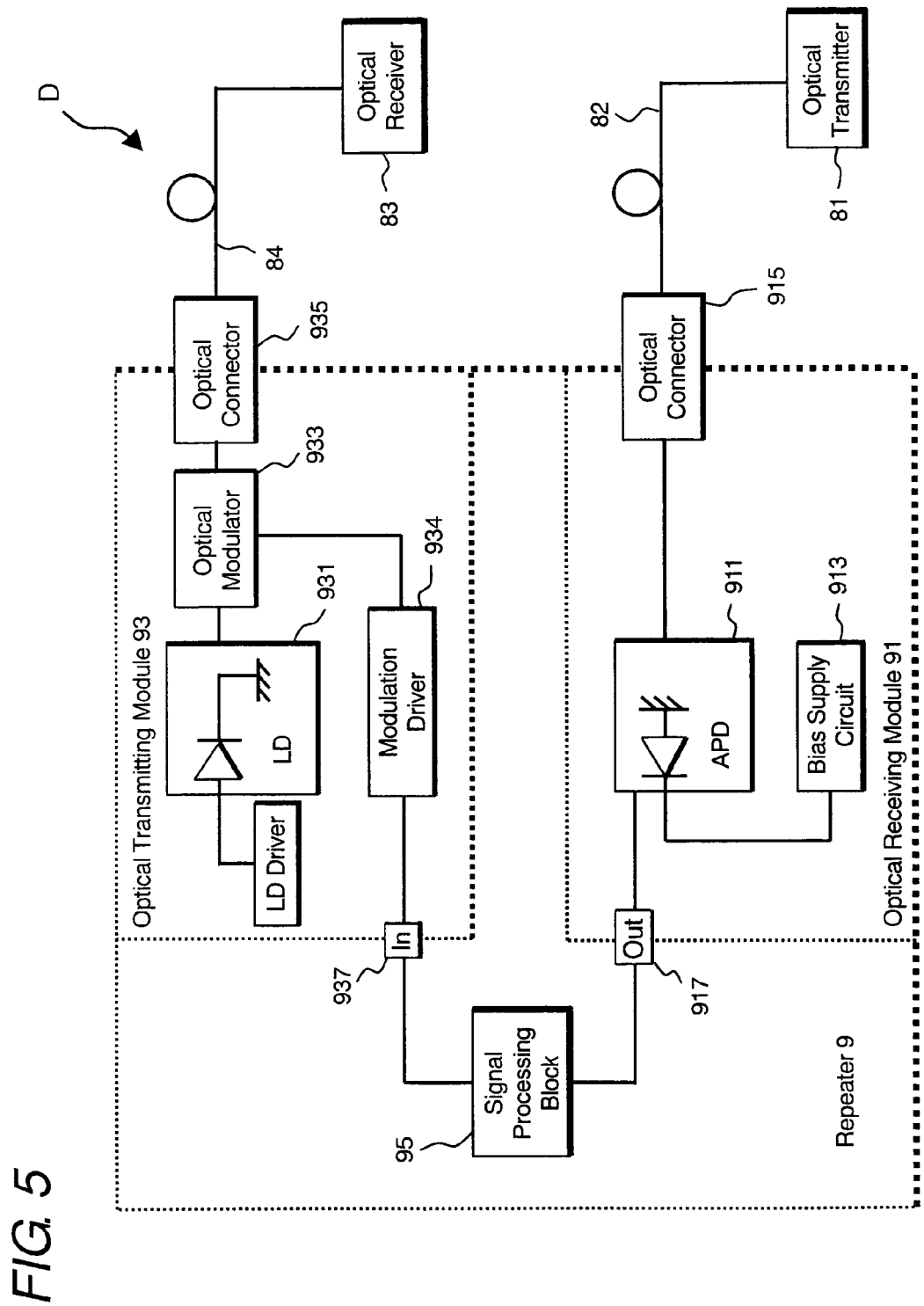
FIG. 5 is an optical communication system according to the third embodiment of the present invention.

FIG. 5 is a block diagram of an optical communication system D according to the third embodiment of the present invention. The optical communication system D includes an optical transmitter 81, an optical receiver 83 and a repeater 9. The optical fiber 82 connects the optical transmitter 81 to the repeater 9, while another optical fiber 84 connects the optical repeater 9 to the optical receiver 83.

The repeater 9 includes an optical receiving module 91, an optical transmitting module 93 and a signal-processing block 95. The optical receiving module 91 provides one of light receiving circuits aforesaid as embodiments of the present invention, which has a bias supply circuit 913 and an APD 911. An optical signal Ps generated by the transmitter 81 transmits in the optical fiber 82 and enters the APD 911 via the optical connector 915 provided in the optical repeater 9. The optical signal Ps thus received by the repeater 9 is converted to a corresponding electrical signal by the APD 911 and outputs from the terminal 917. The output electrical signal 917 is processed in the signal-processing block 95 such that the distortion and noises included in the signal Ps are removed and thus processed signal is amplified.

The optical transmitting module 93 includes a laser diode (LD) 931, an LD-driver, an optical modulator 933 for modulating light output from the LD 931 and a modulation driver 934 for driving the optical modulator 933. The LD-driver provides a bias current to the LD 931. The signal output from the processing block 95 is received by the modulation driver 934 via the terminal 937. The light emitted from the LD 931 is modulated to an optical signal P's, that corresponds to the original optical signal Ps, by the optical modulator 933 and enters the optical fiber 84 via the optical connector 935. The optical signal P's, thus enters the optical fiber 84, is transmitted in the optical fiber 84, and finally received by the optical receiver 83.

From the invention thus described, it will be obvious that the invention and its application may be varied in many ways. Such variations are not to be regarded as a departure from the spirit and scope of the invention, and all such modifications as would be obvious to one skilled in the art are intended for inclusion within the scope of the following claims.

What is claimed is:

1. A light-receiving circuit capable of compensating a temperature dependence of a light-receiving device, comprising:
    a bias supply circuit having an input and an output, said output outputting a bias voltage to said light-receiving device;
    a voltage divider having a division ratio, said voltage divider receiving said bias voltage output from said bias supply circuit, dividing said bias voltage based on said division ratio and feeding back said divided bias voltage to said input of said bias supply circuit; and
    a temperature compensation circuit including a differential amplifier having an inverting input, a non-inverting input and an output, a coupling resistor for coupling said output of said differential amplifier to said input of said bias supply circuit, and a temperature-sensing resistor connected between said inverting input and said output of said differential amplifier, said differential amplifier operating in an inverting mode to adjust said division ratio of said voltage divider as a linear function to temperatures so as to compensate said temperature dependence of said light-receiving device,
    wherein said temperature-sensing resistor senses a temperature of said light-receiving device.

2. The light-receiving circuit according to claim 1, wherein said temperature-sensing resistor has a positive temperature co-efficient.

3. The light-receiving circuit according to claim 2, wherein said temperature co-efficient is greater than 1000 ppm/° C.

4. The light-receiving circuit according to claim 1, wherein said temperature compensation circuit further includes
    a first input coupled to said inverting input of said differential amplifier through a first resistor,
    a second input coupled to said non-inverting input of said differential amplifier,
    wherein a first signal for determining said bias voltage is inputted to said first input, and a second signal for compensating said temperature co-efficient of said light-receiving device superposed on said first signal is inputted to said second input.

5. The light-receiving circuit according to claim 4, further includes
    a thermistor for monitoring said temperature of said light-receiving device, said thermistor outputting a sensing signal corresponding to said temperature of said light-receiving device, and
    a microprocessor for receiving said sensing signal and for outputting said first signal and said second signal to said temperature compensation circuit.

6. The light-receiving circuit according to claim 5, wherein said microprocessor includes a first digital-to-analog converter for outputting said first signal and a second digital-to-analog converter for outputting said superposed first and second signals.

7. The light-receiving circuit according to claim 1, wherein said differential amplifier is an operational amplifier.

8. The light-receiving circuit according to claim 1, wherein said voltage divider includes a first resistor and a second resistor connected to said first resistor in series, one terminal of said second resistor being connected to said output of said bias supply circuit and the other terminal of said second resistor being connected to one terminal of said first resistor and said input of said bias supply circuit, the other terminal of said first resistor being grounded.

9. The light-receiving circuit according to claim 1, wherein said light-receiving device is an avalanche photodiode.

* * * * *